United States Patent [19]

Bond

[11] 4,136,710
[45] Jan. 30, 1979

[54] FLOATING SEAT STRUCTURE FOR GATE VALVES

[75] Inventor: John A. Bond, Houston, Tex.

[73] Assignee: ACF Industries, Incorporated, New York, N.Y.

[21] Appl. No.: 840,868

[22] Filed: Oct. 11, 1977

[51] Int. Cl.² ............................................. F16L 7/00
[52] U.S. Cl. ............................ 137/375; 137/246.22; 251/172; 251/196
[58] Field of Search ..................... 137/246.22, 375; 251/172, 328, 196

[56] References Cited

U.S. PATENT DOCUMENTS

| 2,591,038 | 4/1952 | Allen | 251/328 |
| 2,616,655 | 11/1952 | Hamer | 251/328X |
| 3,367,625 | 2/1968 | Fortune | 251/172 |
| 3,405,911 | 10/1968 | Bolling | 251/172 |
| 3,610,569 | 10/1971 | Reaves | 251/172 X |
| 3,929,316 | 12/1975 | Guthrie | 251/328 X |

FOREIGN PATENT DOCUMENTS 921214  3/1963  United Kingdom ................... 251/328

Primary Examiner—Harold W. Weakley
Attorney, Agent, or Firm—Eugene N. Riddle

[57] ABSTRACT

A floating seat ring for a gate valve structure has an external pressure source to move the seat ring into engagement with the gate valve. A pocket for the seat ring is formed by a counterbore in the valve body and a tubular insert is inserted within the valve body bore extending within the seat ring. This inner end portion of the tubular insert defines with the counterbore the pocket for the seat ring for floating back and forth movement. An external pressure source is in fluid communication with the pocket behind the seat ring to move the seat ring outwardly.

4 Claims, 3 Drawing Figures

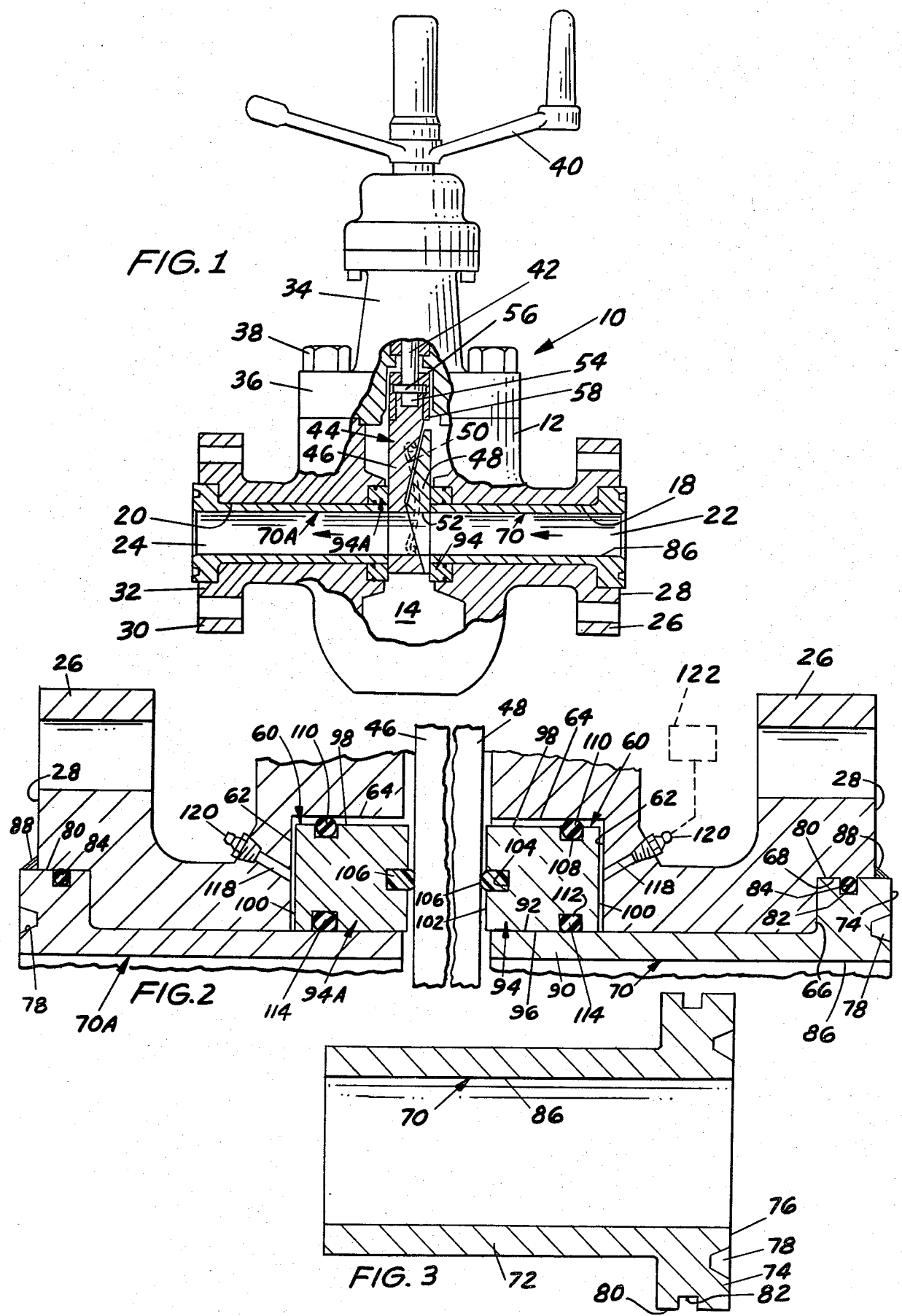

FLOATING SEAT STRUCTURE FOR GATE VALVES

BACKGROUND OF THE INVENTION

The prior art discloses gate valves with floating seats that are responsive to an external pressure source under certain conditions. An external pressure source, such as obtained by the injection of lubricant, is inserted behind a seat ring to urge or bias the seat ring outwardly into engagement with the gate to provide a fluid-tight engagement. The floating seat is usually a seat ring which fits into a pocket with a fluid source in fluid communication with the pocket.

DESCRIPTION OF PRESENT INVENTION

The present invention is directed to a gate valve having a body with a bore therethrough to form inlet and outlet flow passages. The valve body has a counterbore or annular recess about each flow passage at the valve chamber and a seat ring is positioned within the recesses. A generally cylindrical tubular insert is inserted within the valve bore at each of the inlet and outlet ends of the valve body. The inner end portion of the insert is received within the seat ring and forms with the recess an annular pocket for the seat ring. Inner and outer peripheral seals on the seat ring permit fluid pressure to be injected into the pocket behind the seat ring to urge the seat ring outwardly into tight sealing engagement with the gate valve. Thus, a pocket is easily formed for the seat ring by a counterbore in the valve bore and the inner end portion of the insert. The seat ring may be easily removed from the pocket for service or replacement.

When employed with an expanding gate valve assembly, the fluid pressure urging the floating seat ring into engagement with the movable gate assembly at the fully expanded closed position may be released prior to movement of the gate assembly to open position and the operating torque required for movement of the gate assembly is minimized.

BRIEF DESCRIPTION OF THE DRAWINGS

In the accompanying drawings in which one possible embodiment of the invention is illustrated, FIG. 1 is a sectional view, partly in elevation, of a gate valve structure having an expanding gate valve assembly and embodying a floating seat arrangement incorporating the present invention;

FIG. 2 is an enlarged section of a tubular member inserted within the bore of the valve body and forming with a body counterbore a seat pocket for a floating seat; and FIG. 3 is a sectional view of the tubular insert removed from the valve bore of FIG. 2.

Referring now to the drawings for a better understanding of the invention, a gate valve structure generally indicated at 10 including a valve body 12 having a valve chamber 14 therein. Valve body 12 has an inlet bore 18 and an outlet bore 20 therein. An inlet flow passage is defined at 22 and an outlet flow passage is defined at 24. Body 12 has an inlet end flange 26 with an end face 28 and an outlet end flange 30 with an end face 32. Suitable openings are provided in end flanges 26 and 30 for connection to an adjacent flange (not shown).

A bonnet 34 having a flange 36 is bolted at 38 to the upper end of body 12. A handle 40 engages in threaded relation a valve stem 42 upon rotation thereof for movement of a gate valve assembly indicated generally at 44 between open and closed positions. Gate valve assembly 44 includes a gate element 46 having a V-shaped back face and a segment 48 which has a complementary V-shaped back face received within the V-shaped face of gate element 46. Springs 40 are provided on each side of valve assembly 44 to urge gate segment 48 and gate element 46 toward a collapsed or retracted position. An opening 52 in gate assembly 44 is adapted to be aligned with flow passages 22 and 24 in an open position of gate assembly 44. Gate element 46 has an upper threaded extension 54 with a longitudinal slot therein. Stem 42 has an end flange and a key 56 fitting within the slot in extension 54. This permits relative longitudinal movement between stem 42 and gate element 46. A cap 58 extending around the flange on stem 42 connects stem 42 to threaded extension 54 with key 56 fitting within the longitudinal slot of extension 54.

The upstream seat structure is identical to the downstream seat structure and only the upstream seat structure will be explained in detail hereinafter, it being understood that the downstream seat structure is identical with similar reference numerals employed. Upstream bore 18 has a counterbore adjacent valve chamber 14 to form an annular recess at 60 defining a rear wall 62 and a circumferential annular wall 64 perpendicular to rear wall 62 and extending in a direction generally parallel to the longitudinal axis of flow passage 22. End face 28 of end flange 26 has a counterbore to form an end wall 66 and an outer circumferential wall 68. A generally cylindrical tubular insert is indicated generally at 70 and has a cylindrical main body 72 with an end flange 74 thereon. Rear face 76 of end flange 74 has an annular tapered groove 78 to receive a metal seal ring therein for connection to an adjacent API type flange. An outer peripheral surface 80 of flange 74 has an outer circumferential groove 82 receiving an O-ring 84 for sealing between annular wall 68 and flange 74. Tubular insert 70 is inserted within bore 18 and has an inner peripheral surface defining inlet flow passage 22. Insert 70 is secured in position within bore 18 by welding at 88 to face 28. An inner end portion 90 of tubular insert 70 has an outer circumferential surface 92 which defines with rear face 62 and outer circumferential wall 64 a pocket generally coextensive with recess 60. Mounted within the pocket formed by surface 92, rear wall 62, and outer circumferential wall 64 is a metal seat ring generally indicated at 94. Seat ring 94 has an inner peripheral surface 96, an outer peripheral surface 98, a rear face 100, and a front face 102. Front face 102 has an annular groove 104 therein and a face seal 106 positioned within groove 104 to engage the adjacent gate segment 48. Face seal 106 is of a generally rectangular cross-section and may be formed of nylon or tetrafluoroethylene. Outer peripheral surface 98 has an annular groove 108 therein and an O-ring 110 is positioned within groove 108 to seal between annular wall 64 and seat ring 94. Inner peripheral surface 96 has an annular groove 112 therein and an O-ring 114 is positioned within annular groove 112 to seal between inner peripheral surface 96 and outer peripheral surface 92 of inner end portion 90.

A fluid passage 118 in body 12 leads to pocket or recess 60 at the rear face 100 of seal ring 94. A suitable fitting 120 is connected to fluid passage 118 and a source of fluid indicated at 122 may be provided to provide a fluid pressure source for rear face 100 of seat ring 94. A lubricant, for example, may be employed as a fluid pressure source and is effective to move seat ring 94 outwardly into tight engagement with gate assembly 44. The downstream seat ring is indicated generally at 94A and the downstream tubular insert is indicated generally at 70A.

In operation, seat rings 94, 94A are mounted for floating back and forth movement and the application of external fluid pressure forces seat rings 94, 94A outwardly against gate assembly 44. When gate assembly 44 is moved to a closed position from the open position shown in FIG. 1, segment 48 and gate element 46 expand outwardly from each other at the fully closed position. Fluid pressure exerted upon the floating seats 94 moves the seats 94 outwardly into tight contact with the gate assembly 44. When gate assembly 44 is moved from the closed position to open position, the fluid pressure may be released from the source of pressure 122 and seats 94 may be easily moved inwardly to permit the easy collapsing of the expanding gate assembly 44 for movement from the full open position upon an initial operating torque being applied by rotation of operating handle 40. This minimizes the operating torque required for rotation of handle 40.

A seat pocket is easily provided for the seat ring and the fluid pressure source by the utilization of tubular insert 70 without the necessity of machining a pocket in the faces of the valve body defining valve chamber 14. It is only necessary to provide a counterbore in the valve body and tubular insert 70 forms with the counterbore the pocket for receiving the floating seat ring 94.

What is claimed is:

1. A gate valve structure comprising a valve body having a valve chamber therein and inlet and outlet flow passages communicating with the valve chamber, an expanding valve assembly including a gate element and segment slidably mounted within the valve chamber for movement between open and closed positions of the valve assembly with said gate element and segment expanding away from each other at the fully closed position;

said valve body having a counterbore about each flow passage adjacent the valve chamber to define an annular recess having a rear wall and an outer circumferential wall, said valve body having an end flange about each of the flow passages, each end flange havng an outwardly facing annular recess about the flow passage therein;

a tubular insert fitting within the flow passage having cylindrical main body of a uniform cross section defining the flow passage and an annular flange about the outer end of said cylindrical main body fitting within the recess of the end flange, the inner end portion of said insert being positioned closely adjacent the gate assembly and having an outer peripheral surface defining with the rear and outer circumferential walls of the recess a pocket; and a metallic seat ring mounted within said pocket for floating back and forth movement relative to the gate assembly and the tubular insert and having a resilient face seal for engaging the gate assembly in sealing relation, said seat ring further having inner and outer peripheral surfaces with an annular groove about each of the peripheral surfaces, an O-ring being positioned in each of the grooves to seal between the peripheral surfaces and the adjacent surfaces forming the seat pocket.

2. The gate valve structure as set forth in claim 1 wherein said insert flange has an outer peripheral surface, an annular groove is provided in said outer peripheral surface, and an O-ring is positioned in said annular groove to seal between the valve body and the flange.

3. A gate valve structure as set forth in claim 2 wherein said flange has a rear face and an annular tapered groove is provided in said rear face adapted to receive a metal seal therein.

4. A gate valve structure as set forth in claim 1 wherein a fluid passage extends between the pocket receiving the seat ring and the exterior of said valve body, and a source of fluid pressure is operatively connected to said flow passage to provide fluid pressure to said pocket for urging the seat ring outwardly into tight engagement with the gate valve assembly.

* * * * *